US008467757B2

(12) United States Patent
Ahn

(10) Patent No.: US 8,467,757 B2
(45) Date of Patent: Jun. 18, 2013

(54) WIDEBAND RECEIVER FOR WIRELESS COMMUNICATION SYSTEM AND METHOD FOR CONTROLLING THE SAME

(75) Inventor: Cheol-Woo Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 12/871,221

(22) Filed: Aug. 30, 2010

(65) Prior Publication Data

US 2011/0081880 A1 Apr. 7, 2011

(30) Foreign Application Priority Data

Oct. 1, 2009 (KR) .................. 10-2009-0093958

(51) Int. Cl.
*H04B 1/16* (2006.01)

(52) U.S. Cl.
USPC .......... 455/260; 455/323; 455/334; 455/296; 455/313; 455/314

(58) Field of Classification Search
None
See application file for complete search history.

(56) References Cited

U.S. PATENT DOCUMENTS

| 5,142,369 | A | * | 8/1992 | Grubbs et al. | 348/729 |
| 5,717,368 | A | * | 2/1998 | Niiranen | 333/202 |
| 5,963,852 | A | * | 10/1999 | Schlang et al. | 455/76 |
| 6,016,170 | A | * | 1/2000 | Takayama et al. | 348/731 |
| 6,028,411 | A | * | 2/2000 | Motzko et al. | 318/606 |
| 6,112,070 | A | * | 8/2000 | Katsuyama et al. | 455/307 |
| 7,242,912 | B2 | * | 7/2007 | Maligeorgos et al. | 455/88 |
| 2008/0317185 | A1 | * | 12/2008 | Mueller et al. | 375/376 |

FOREIGN PATENT DOCUMENTS

KR 10-2001-0113085 A 12/2001

* cited by examiner

*Primary Examiner* — Fayyaz Alam
*Assistant Examiner* — Mohammed Rachedine
(74) *Attorney, Agent, or Firm* — Jefferson IP Law, LLP

(57) ABSTRACT

A wideband receiver for a wireless communication system and a method for controlling the same are provided. In the wideband receiver for a wireless communication system, a receive path includes a mixer for receiving a Radio Frequency (RF) signal having a frequency $f_{SG}$ and for converting the RF signal into an Intermediate Frequency (IF) signal having a frequency $f_{IF}$ by mixing the RF signal with a first local oscillation signal having a first local oscillation frequency $f_{LO1}$, and at least one Phase Locked Loop (PLL) for providing the local oscillation signal to the mixer. A control block determines whether a half-IF signal having a center frequency of $f_{SG}-f_{IF}/2$ exists in the IF signal, and when the half-IF signal exists, controls the at least one PLL to generate a second local oscillation signal having a second local oscillation frequency $f_{LO2}$ greater than the first local oscillation frequency $f_{LO1}$.

13 Claims, 10 Drawing Sheets

WIDEBAND RECEIVER FOR WIRELESS COMMUNICATION SYSTEM AND METHOD FOR CONTROLLING THE SAME

PRIORITY

This application claims the benefit under 35 U.S.C. §119(a) of a Korean patent application filed in the Korean Intellectual Property Office on Oct. 1, 2009 and assigned Serial No. 10-2009-0093958, the entire disclosure of which is hereby incorporated by reference.

BACKGROUND OF THE INVENTION

1. Field of the Invention

The present invention relates generally to a wireless communication system. More particularly, the present invention relates to an apparatus for receiving wideband Radio Frequency (RF) signals, and a method for controlling the same.

2. Description of the Related Art

For transmission of mass multimedia, communication systems require wider signal bandwidths. In addition, to improve flexibility, the communication systems should support not only a certain operator's band but also a wide frequency band.

A receiver in the typical communication system removes unnecessary signals from an operator's band by filtering a signal received via an antenna using an RF front-end filter. The signal, which has passed the RF front-end filter, is mixed with a Local Oscillator (LO) signal generated in a Phase Locked Loop (PLL) by a mixer, thereby being down-converted into an Intermediate Frequency (IF) signal. However, signals that were not removed in the RF front-end filter may still affect the received signal. In particular, a half IF serves as interference to the received signal due to second harmonic signals caused by nonlinearity of the mixer.

FIG. 1 shows a characteristic of an RF front-end filter in a communication system using an operator's band according to the related art.

Referring to FIG. 1, a signal 104 of a received-signal frequency $f_{SG}$ is down-converted into a signal of an IF $f_{IF}$ by being mixed with a signal of a local signal frequency $f_{LO}$ generated in a PLL. Because a bandwidth 102 of the RF front-end filter, which passes only the signals in the operator's band, is sufficiently narrow, only the signal 104 of the received-signal frequency $f_{SG}$ can pass the RF front-end filter, and an interference signal 106 having a half IF ($f_{SG}-f_{IF}/2$) is removed. The signal 106 of a half IF is removed in the RF front-end filter, preventing degradation of the received signal.

FIG. 2 shows a characteristic of an RF front-end filter in a communication system using a wideband according to the related art.

Referring to FIG. 2, because of the wide pass bandwidth 202 of the RF front-end filter, not only a received-signal frequency $f_{SG}$ but also a half IF ($f_{SG}-f_{IF}/2$) may pass through the RF front-end filter.

The half IF has a characteristic defined by Equation (1) below.

$$\text{Half\_IF} = f_{SG} - \frac{f_{IF}}{2} = \frac{f_{SG}+f_{LO}}{2} \quad (1)$$

$$\frac{f_{SG}+f_{LO}}{2} - f_{LO} = \frac{f_{SG}-f_{LO}}{2} = \frac{f_{IF}}{2}$$

$$2 \times \frac{f_{SG}+f_{LO}}{2} - 2 \times f_{LO} = f_{SG}-f_{LO} = f_{IF}$$

As described above, when at least one term having a degree of 2 or more is additionally generated due to the nonlinearity of a mixer, an interference signal of a half IF is located at $f_{IF}$ as it passes the mixer, resulting in degradation of demodulation performance and thus reducing the overall reception performance of the system. To solve this half IF problem, technologies using a dual-IF structure and the like have been released conventionally, but these technologies may be complex in structure.

SUMMARY OF THE INVENTION

An aspect of the present invention is to address at least the above-mentioned problems and/or disadvantages and to provide at least the advantages described below. Accordingly, an aspect of the present invention is to provide a reception apparatus for addressing an interference problem which may occur in realizing a receiver in a wideband communication system, and a method for controlling the same.

Another aspect of the present invention is to provide a reception apparatus for detecting an interference signal caused by a half IF and cancelling the interference signal so as not to affect reception performance in a wideband receiver, and a method for controlling the same.

In accordance with an aspect of the present invention, a wideband receiver for a wireless communication system is provided. The wideband receiver includes a receive path having a mixer for receiving a Radio Frequency (RF) signal having a frequency $f_{SG}$ and for converting the RF signal into an Intermediate Frequency (IF) signal having a frequency $f_{IF}$ by mixing the RF signal with a first local oscillation signal having a first local oscillation frequency $f_{LO1}$, and at least one Phase Locked Loop (PLL) for providing the first local oscillation signal to the mixer, and a control block for determining whether a half-IF signal having a center frequency of $f_{SG}-f_{IF}/2$ exists in the IF signal, and when the half-IF signal exists, for controlling the at least one PLL to generate a second local oscillation signal having a second local oscillation frequency $f_{LO2}$ greater than the first local oscillation frequency $f_{LO1}$.

In accordance with another aspect of the present invention, a method for controlling a wideband receiver for a wireless communication system is provided. The method includes detecting an IF signal from a receive path having a mixer for receiving an RF signal having a frequency $f_{SG}$ and converting the RF signal into the IF signal having a frequency $f_{IF}$ by mixing the RF signal with a first local oscillation signal having a first local oscillation frequency $f_{LO1}$, determining whether a half-IF signal having a center frequency of $f_{SG}-f_{IF}/2$ exists in the IF signal, and when the half-IF signal exists, providing a second local oscillation signal to the receive path, the second local oscillation signal having a second local oscillation frequency $f_{LO2}$ greater than the first local oscillation frequency.

In accordance with another aspect of the present invention, a wideband receiver for a wireless communication system is provided. The wideband receiver includes a main receive path having a first mixer for receiving a first RF signal having a frequency $f_{SG}$, received via a first antenna, and for converting the first RF signal into a first IF signal, a diversity receive path having a second mixer for receiving a second RF signal having a frequency $f_{SG}$, received via a second antenna, and for converting the second RF signal into a second IF signal, a first PLL for generating a first local oscillation signal having a first local oscillation frequency and for providing the first local oscillation signal to the first mixer in the main receive path, a second PLL for generating a second local oscillation signal having a second local oscillation frequency different from the first local oscillation frequency, a switch for selecting one of the first PLL and the second PLL, and for connecting the selected PLL to the second mixer in the diversity receive path, and a control block for controlling the switch to select the second PLL, for monitoring whether reception performance of the diversity receive path has been improved by the second local oscillation signal from the second PLL, and when the reception performance has been improved, for controlling the first PLL such that the first local oscillation signal is generated to have the second local oscillation frequency.

In accordance with another aspect of the present invention, a method for controlling a wideband receiver for a wireless communication system is provided. The method includes controlling both of a main receive path and a diversity receive path to operate using a first local oscillation signal having a first local oscillation frequency generated by a first PLL, the main receive path having a first mixer for receiving a first RF signal having a frequency $f_{SG}$, received via a first antenna and for converting the first RF signal into a first IF signal, the diversity receive path having a second mixer for receiving a second RF signal having a frequency $f_{SG}$, received via a second antenna and converting the second RF signal into a second IF signal, controlling the diversity receive path to operate according to a second local oscillation signal having a second local oscillation frequency generated by a second PLL, and monitoring whether reception performance of the diversity receive path has been improved by the second local oscillation signal from the second PLL, and when the reception performance has been improved, controlling the first PLL such that the first local oscillation signal is generated to have the second local oscillation frequency.

In accordance with another aspect of the present invention, a wideband receiver for a wireless communication system is provided. The wideband receiver includes a receive path for receiving a Radio Frequency (RF) signal and for generating a first local oscillation frequency based on the RF signal and an Intermediate Frequency signal; and a control block for determining whether a half-IF signal is present in the IF signal, and for controlling the receive path to generate a second local oscillation frequency greater than the first local oscillation frequency.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like drawing reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
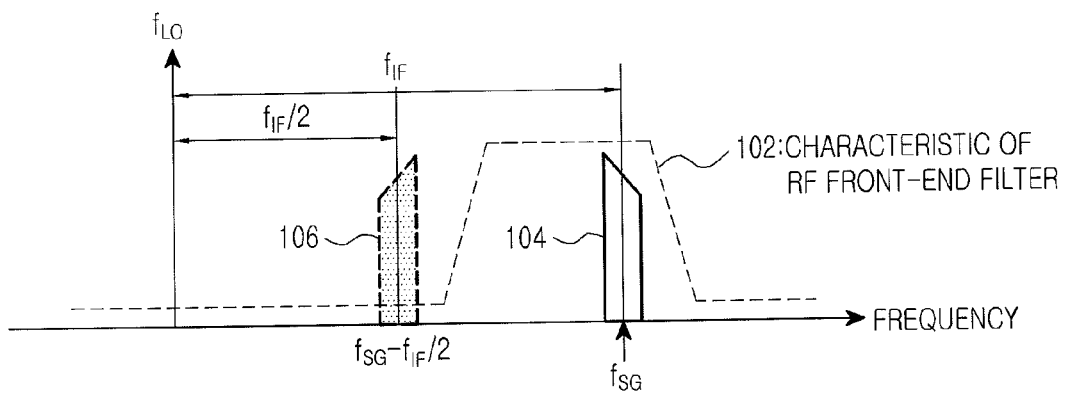
FIG. 1 is a diagram showing a characteristic of an RF front-end filter in a communication system using an operator's band according to the related art.
Figure 2:
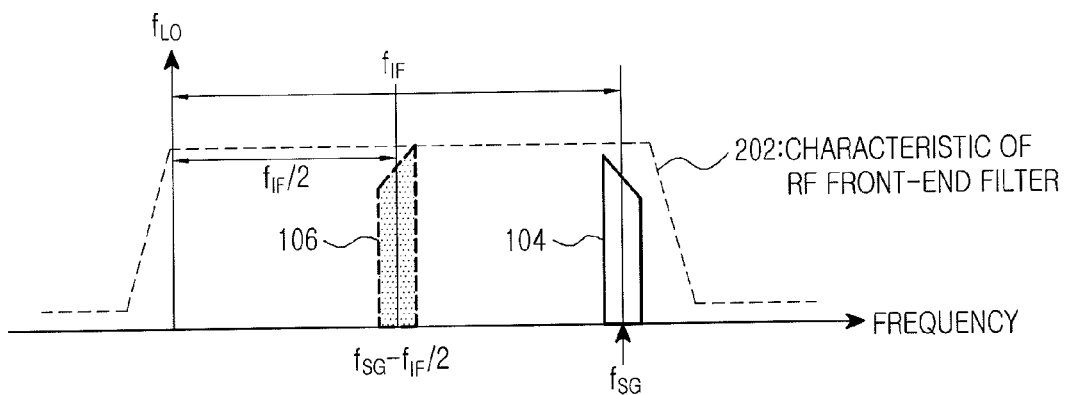
FIG. 2 is a diagram showing a characteristic of an RF front-end filter in a communication system using a wideband band according to the related art.
Figure 3:
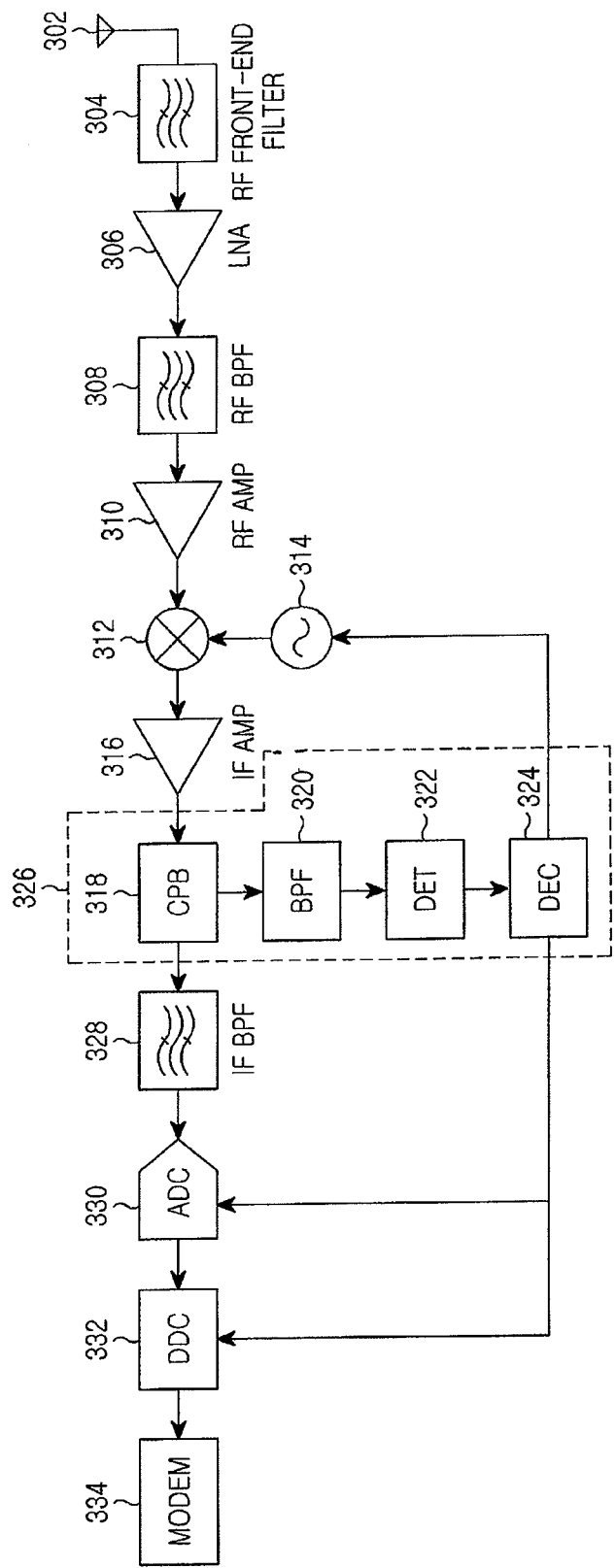
FIG. 3 is a block diagram showing a structure of a wideband receiver according to an exemplary embodiment of the present invention.

FIG. 3 is a structure of a wideband receiver according to an exemplary embodiment of the present invention. Although a plurality of components constituting a wideband receiver are shown herein, it should be understood that these components are not provided to limit the scope of the present invention and various modifications can be made without departing from the scope of the present invention.

Referring to FIG. 3, the wideband receiver includes a receive path having an antenna 302, a Radio Frequency (RF) front-end filter 304, a Low Noise Amplifier (LNA) 306, an RF Band Pass Filter (BPF) 308, an RF Amplifier (AMP) 310, a mixer 312, a Phase Locked Loop (PLL) 314, an Intermediate Frequency (IF) amplifier 316, an IF filter 328, an Analog-to-Digital Converter (ADC) 330, a Digital Down-Converter (DDC) 332 and modem 334, and further includes a control block 326 located in front of the IF filter 328.

When the antenna 302 receives a signal from the other side (e.g., a transmission side) and sends the received signal to the RF front-end filter 304, the RF front-end filter 304 removes unnecessary signals from a designated system band. The LNA 306 primarily amplifies an output of the RF front-end filter 304 without generating noises. The RF BFP 308 removes out-band signals which may be generated in the signal that has passed the LNA 306. The RF amplifier 310 additionally amplifies an RF signal output from the RF BPF 308.

The mixer 312 down-converts an RF signal provided from the RF amplifier 310 into an IF signal by mixing the RF signal with a local oscillation signal generated by the PLL 314. The IF amplifier 316 amplifies an IF signal in its IF band, and the IF signal amplified in the IF amplifier 316 is delivered to the IF filter 328 through the control block 326. The IF filter 328 finally removes spurious waves from the IF signal in advance of digital conversion. The ADC 330 converts the analog IF signal into a digital signal so that for processing in the modem 334. The digital signal, which has passed the ADC 330, is additionally down-converted from the IF band to a baseband by the DDC 332, and then delivered to the modem 334. The modem 334 restores desired information by demodulating and decoding the baseband digital signal received from the DDC 332.

The control block 326 detects an interference-band signal from an IF signal output from the IF amplifier 316, and changes a local oscillation frequency output from the PLL 314 from $f_{LO1}$ to $f_{LO2}$ according to the detection results. An IF frequency output from the mixer 312 is changed from $f_{IF1}$ to $f_{IF2}$ according to the change in the local oscillation frequency. The operation of the control block 326 is described in more detail below with respect to FIGS. 4-7.

Figure 4:
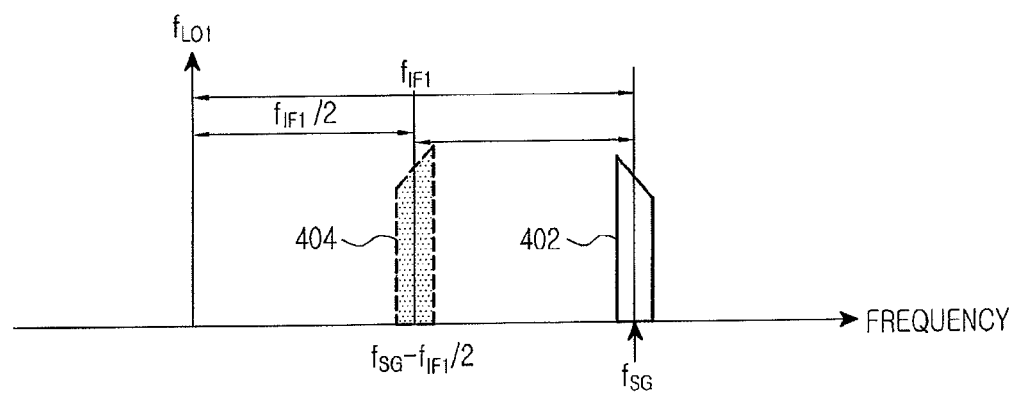
FIG. 4 is a diagram showing a signal spectrum in an RF band in the wideband receiver shown in FIG. 3 according to an exemplary embodiment of the present invention.

FIG. 4 is a signal spectrum in an RF band in the wideband receiver shown in FIG. 3 according to an exemplary embodiment of the present invention.

Referring to FIG. 4, along with a signal 402 of a received-signal frequency $f_{SG}$, a half-IF signal 404 serving as interference additionally exists in an RF band before passing the mixer 312.

Figure 5:
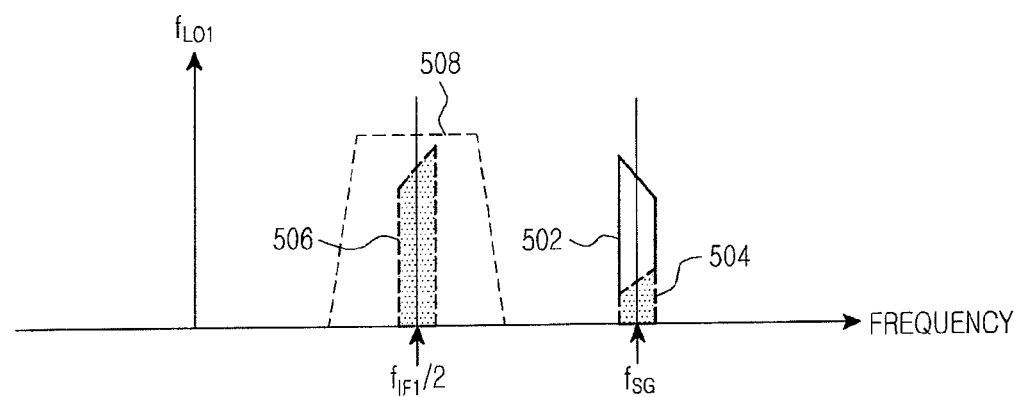
FIG. 5 is a diagram showing a signal spectrum in an IF band in the wideband receiver shown in FIG. 3 according to an exemplary embodiment of the present invention.

FIG. 5 is a signal spectrum in an IF band in the wideband receiver shown in FIG. 3 according to an exemplary embodiment of the present invention.

Referring to FIG. 5, along with a signal 502 in an IF band, a half-IF signal 506 additionally exists, and interference 504 is generated in the signal 502 in the IF band due to the half-IF signal 506. The control block 326 attempts to detect a signal in a frequency band of $f_{IF1}/2$ to determine the presence/absence of the signal 502 in a half IF. To this end, for example, the control block 326 may use a BPF having a filter characteristic 508, which passes a signal in a frequency band with the center of $f_{IF1}/2$.

Referring back to FIG. 3, the control block 326 includes a Coupling Block (CPB) 318, a BPF 320, a Detector (DET) 322, and a frequency Decision Block (DEC) 324. However, the detailed structure of the control block 326 is not limited to the exemplary embodiment shown in the figures and may be changed according to the system design and the designer's intention without departing from the scope of the present invention.

The CPB 318 in the control block 326 detects a signal before undergoing IF filtering, and delivers the detected signal to the BPF 320. The BPF 320, as shown in FIG. 5, has a pass band characteristic 508 for detecting a signal in a specific frequency band with the center of $f_{IF1}/2$. For example, a pass bandwidth of the BFP 320 may be determined to include at least an effective bandwidth of the received signal, i.e., a frequency band having information. A signal output from the BPF 320 is converted into a voltage signal in the detector 322, and the frequency decision block 324 senses the voltage signal. Based on the input voltage signal, the frequency decision block 324 determines the presence or absence of a signal at a frequency $f_{IF1}/2$, and determines whether a level of the signal existing at the frequency $f_{IF1}/2$ exceeds a predetermined threshold $P_{th}$. The threshold may be determined as a level that does not affect reception performance when a signal is received, a level of which satisfies a reception sensitivity required by a modem.

When a level of the signal exceeds the threshold affecting the reception performance, then the frequency decision block 324 changes a local oscillation frequency output from the PLL 314 from $f_{LO1}$ to $f_{LO2}$. At the same time, the frequency decision block 324 changes configurations of an internal filter, a Numeric Controlled Oscillator (NCO), etc., in the ADC 330 and the DDC 332, enabling the ADC 330 and the DDC 332 to process the changed IF $f_{IF2}$.

The changed local oscillation frequency is determined according to the target IF to which the IF frequency is to be changed, so that an IF signal after undergoing frequency conversion is not affected by an interference signal in the RF band. For example, the target IF may be determined such that when a received-signal frequency $f_{SG}$ undergoes frequency conversion in a pass band of the RF front-end filter 304, no local oscillation signal $f_{LO2}$ of the PLL 314 is left, and may also be determined to be two to three times an ADC sampling rate, based on the performance of the ADC 330.

Figure 6:
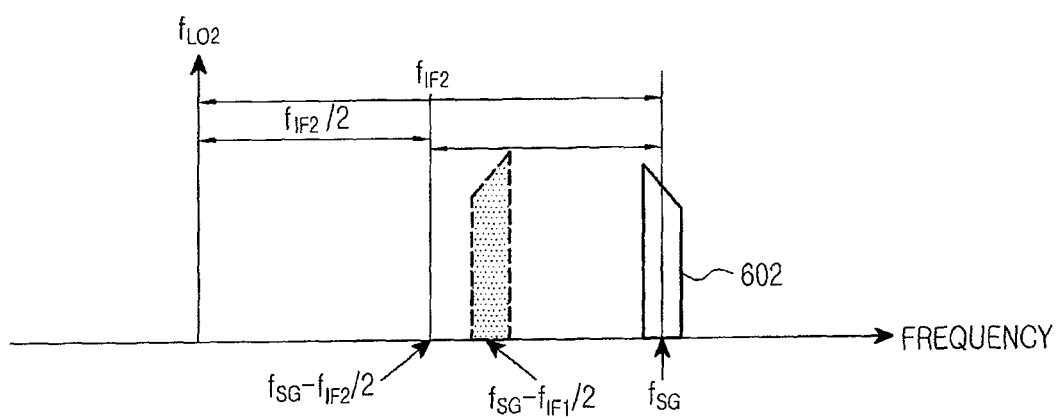
FIG. 6 is a diagram showing a signal spectrum in an RF band after IF conversion in the wideband receiver shown in FIG. 3 according to an exemplary embodiment of the present invention.

FIG. 6 illustrates a signal spectrum in an RF band after IF conversion in the wideband receiver shown in FIG. 3 according to an exemplary embodiment of the present invention.

Referring to FIG. 6, the change to $f_{LO2}$ causes a change to $f_{IF2}$, and thus an interference signal located at $f_{SG}-f_{IF1}/2$ does not affect the down-converted IF signal 602. To this end, $f_{LO2}$ may be determined to be greater than $f_{LO1}$ so that a signal around $f_{SG}-f_{IF2}/2$ may not overlap a signal around $f_{SG}-f_{IF1}/2$.

Figure 7:
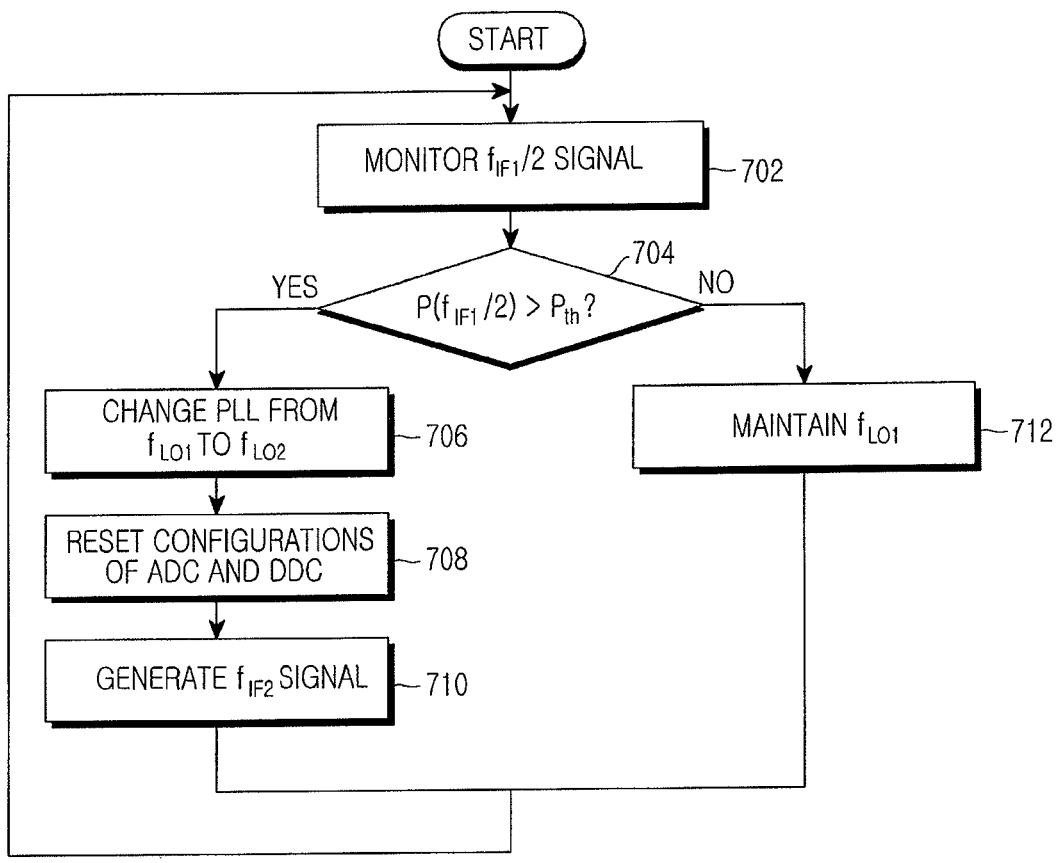
FIG. 7 is a flowchart showing a control operation of a wideband receiver according to an exemplary embodiment of the present invention.

FIG. 7 illustrates a control operation of a wideband receiver according to an exemplary embodiment of the present invention, in which the wideband receiver with the control block 326 generates an IF signal of $f_{IF1}$ using a local oscillation frequency $f_{LO1}$.

Referring to FIG. 7, the control block 326 detects a signal in a specific band with the center of $f_{IF1}/2$ from an IF signal before undergoing IF filtering in step 702, and determines in step 704 whether a level of the detected signal exceeds a predetermined threshold $P_{th}$. If so, the control block 326 proceeds to step 706, and if not, proceeds to step 712. In step 712, a local oscillation frequency of the PLL 314 is maintained.

If the level of the detected signal exceeds the threshold $P_{th}$, the control block 326 controls the PLL 314 to change its output frequency from $f_{LO1}$ to $f_{LO2}$ in step 706, and resets configurations of the ADC 330 and the DDC 332 in step 708 so that they may process an IF signal converted by the changed local oscillation frequency $f_{LO2}$. In step 710, an IF signal of $f_{IF2}$ corresponding to the changed local oscillation frequency $f_{LO2}$ is generated in the mixer 312.

Figure 8:
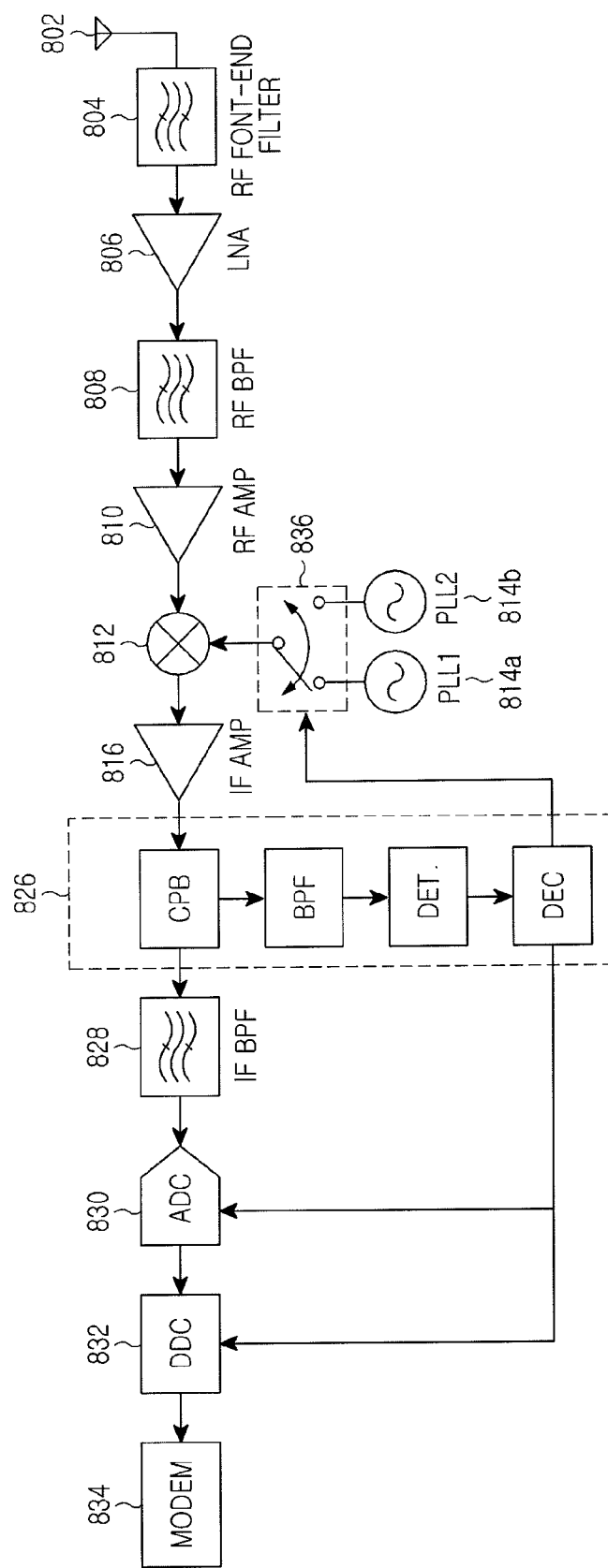
FIG. 8 is a block diagram showing a structure of a wideband receiver according to another exemplary embodiment of the present invention.

FIG. 8 is a structure of a wideband receiver according to an exemplary embodiment of the present invention. While a plurality of components constituting a wideband receiver are shown herein, it should be understood that these components are not provided to limit the scope of the present invention and various modifications can be made without departing from the scope of the present invention.

Referring to FIG. 8, the wideband receiver includes an antenna 802, an RF front-end filter 804, an LNA 806, an RF BPF 808, an RF amplifier 810, a mixer 812, an IF amplifier 816, an IF filter 828, an ADC 830, a DDC 832, and a modem 834. In addition, to eliminate the influence of interference signals without changing IF, the wideband receiver further includes two PLLs 814a and 814b, a switch 836 for selecting one of the PLLs 814a and 814b, and a control block 826 for controlling the switch 836 according to the result of detecting a signal before undergoing IF filtering.

If the antenna 802 receives a signal from the other side and sends the received signal to the RF front-end filter 804, the RF front-end filter 804 removes unnecessary signals from a designated system band. The LNA 806 primarily amplifies an output of the RF front-end filter 804 without generating noises. The RF BFP 808 removes out-band signals which may be generated in a signal that has passed the LNA 806. The RF amplifier 810 additionally amplifies an RF signal output from the RF BPF 808.

The mixer 812 down-converts an RF signal provided from the RF amplifier 810 into an IF signal of $f_{IF}$ by first mixing the RF signal with a local oscillation signal of $f_{LO1}$ generated by the first PLL 814a. The IF amplifier 816 amplifies an IF signal in its IF band. The amplified IF signal is delivered to the IF filter 828 through the control block 826. The IF filter 828 finally removes spurious waves from the IF signal in advance of digital conversion. The ADC 830 converts the analog IF signal into a digital signal for processing in the modem 834. The digital signal, which has passed the ADC 830, is additionally down-converted from the IF band to a baseband by the DDC 832, and is delivered to the modem 834. The modem 834 restores desired information by demodulating and decoding the baseband digital signal received from the DDC 832.

The control block 826 detects an interference-band signal from an IF signal output from the IF amplifier 816, and selects one of the two PLLs 814a and 814b by controlling the switch 836 according to the detection results. The first PLL 814a generates a local oscillation signal of $f_{LO1}$, and the second PLL 814b generates a local oscillation signal of $f_{LO2}$. While a first local oscillation frequency $f_{LO1}$ is calculated by subtracting a desired IF $f_{IF}$ from a received-signal frequency $f_{SG}$, a second local oscillation frequency $f_{LO2}$ is calculated by adding the received-signal frequency $f_{SG}$ to the desired IF $f_{IF}$. With this structure, the wideband receiver as illustrated in FIG. 8 can remove the influence of interference signals against the received signal by simply changing a frequency of the local oscillation signal without changing the IF. Because the IF is not changed, configurations of the ADC 830 and the 832 do not need to be reset. Although two PLLs 814a and 814b are shown in FIG. 8, it is also possible for the wideband receiver to use one wideband RF PLL, and change a local oscillation frequency output from the wideband RF PLL via the control block 826. In this case, the structure of the wideband receiver is similar to that in FIG. 3, so a detailed description thereof will be omitted.

Figure 9A:
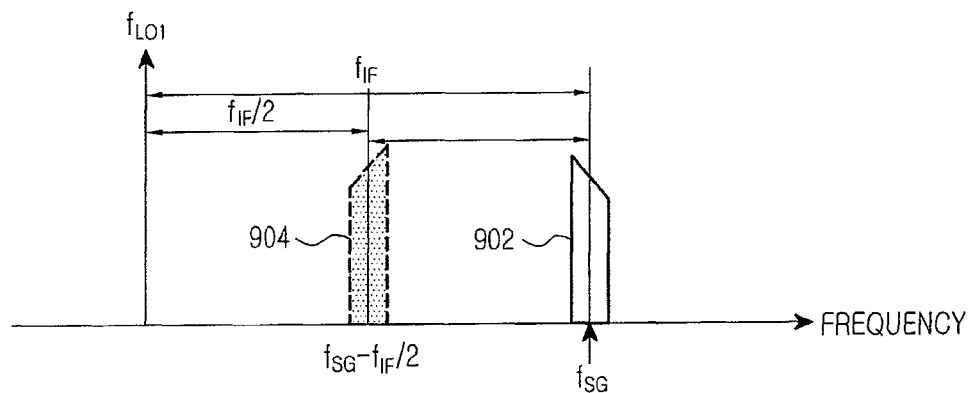
FIGS. 9A and 9B are diagrams showing signal spectra in the wideband receiver shown in FIG. 8 according to an exemplary embodiment of the present invention.
Figure 9B:
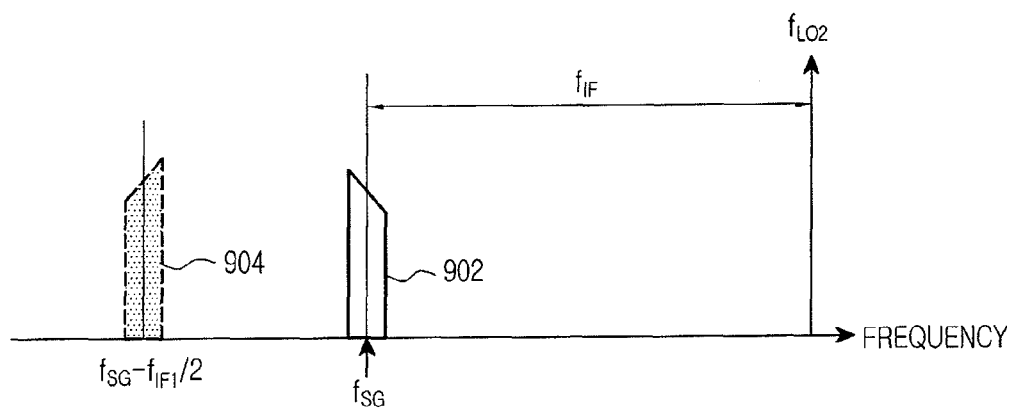

FIGS. 9A and 9B show signal spectra in the wideband receiver shown in FIG. 8 according to an exemplary embodiment of the present invention.

Referring to FIGS. 9A and 9B, before a local oscillation signal is changed, i.e., when $f_{LO1}$ is used, an interference signal 904 of $f_{SG}-f_{IF}/2$ exists in a pass band of the RF front-end filter. On the other hand, as shown in FIG. 9B, when the local oscillation frequency is changed to $f_{LO2}$, an interference signal 904 of $f_{SG}-f_{IF}/2$ exists out of the pass band of the RF front-end filter, thus not affecting an IF signal 902.

Figure 10:
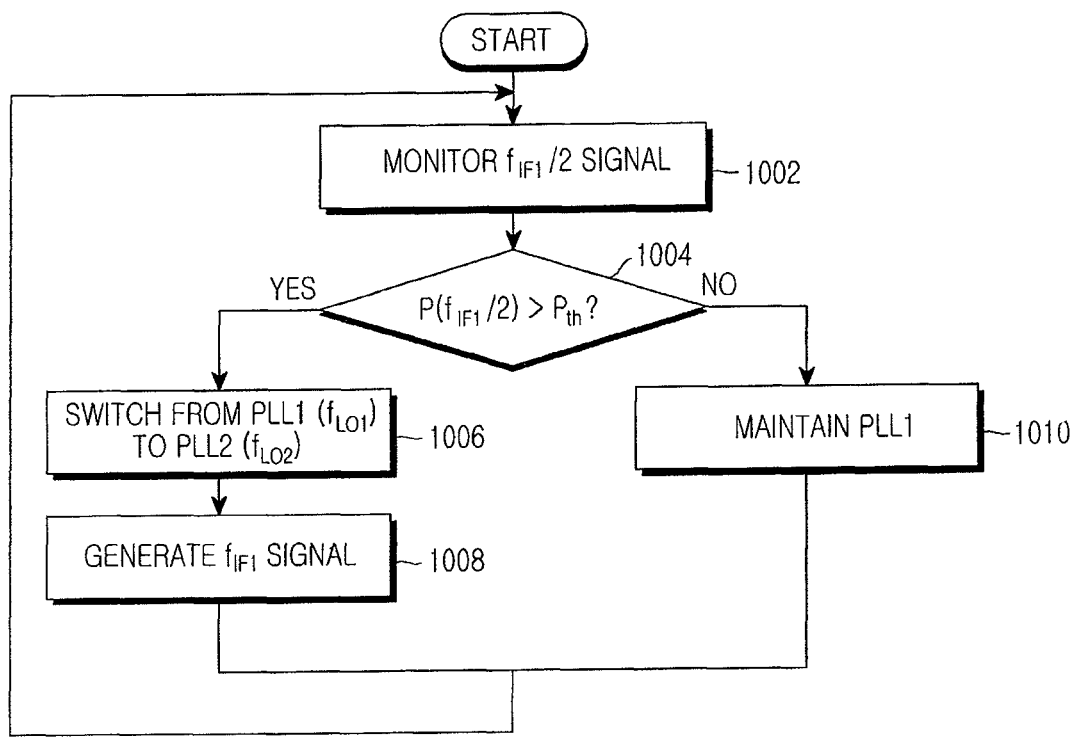
FIG. 10 is a flowchart showing a control operation of the wideband receiver shown in FIG. 8 according to an exemplary embodiment of the present invention.

FIG. 10 is a control operation of the wideband receiver shown in FIG. 8, in which the wideband receiver with the control block 826 generates an IF signal of $f_{IF}$ using a local oscillation frequency $f_{LO1}$ according to an exemplary embodiment of the present invention.

Referring to FIG. 10, the control block 826 detects a signal in a specific band with the center of $f_{IF}/2$ from an IF signal before undergoing IF filtering in step 1002, and determines in step 1004 whether a level of the detected signal exceeds a predetermined threshold $P_{th}$. If so, the control block 826 proceeds to step 1006, and if not, proceeds to step 1010. In step 1010, the first PLL 814a is continuously used and thus the local oscillation frequency is not changed.

If the level of the detected signal exceeds the threshold $P_{th}$, the control block 826 controls the switch 836 so as to connect the second PLL 814b instead of the first PLL 814a to the mixer 812 in order to change the local oscillation frequency from $f_{LO1}$ to $f_{LO2}$, in step 1006. Since the IF is not changed, configurations of the ADC 830 and the DDC 832 do not need to be reset. In step 1008, an IF signal of $f_{IF}$ corresponding to the changed local oscillation frequency $f_{LO2}$ is generated in the mixer 812. Although not shown, in an alternative embodiment, two wideband RF PLLs may be used instead of the two PLLs 814a and 814b. In this case, in step 1006, the control block 826 controls the wideband RF PLLs to change their output frequencies from $f_{LO1}$ to $f_{LO2}$.

Figure 11:
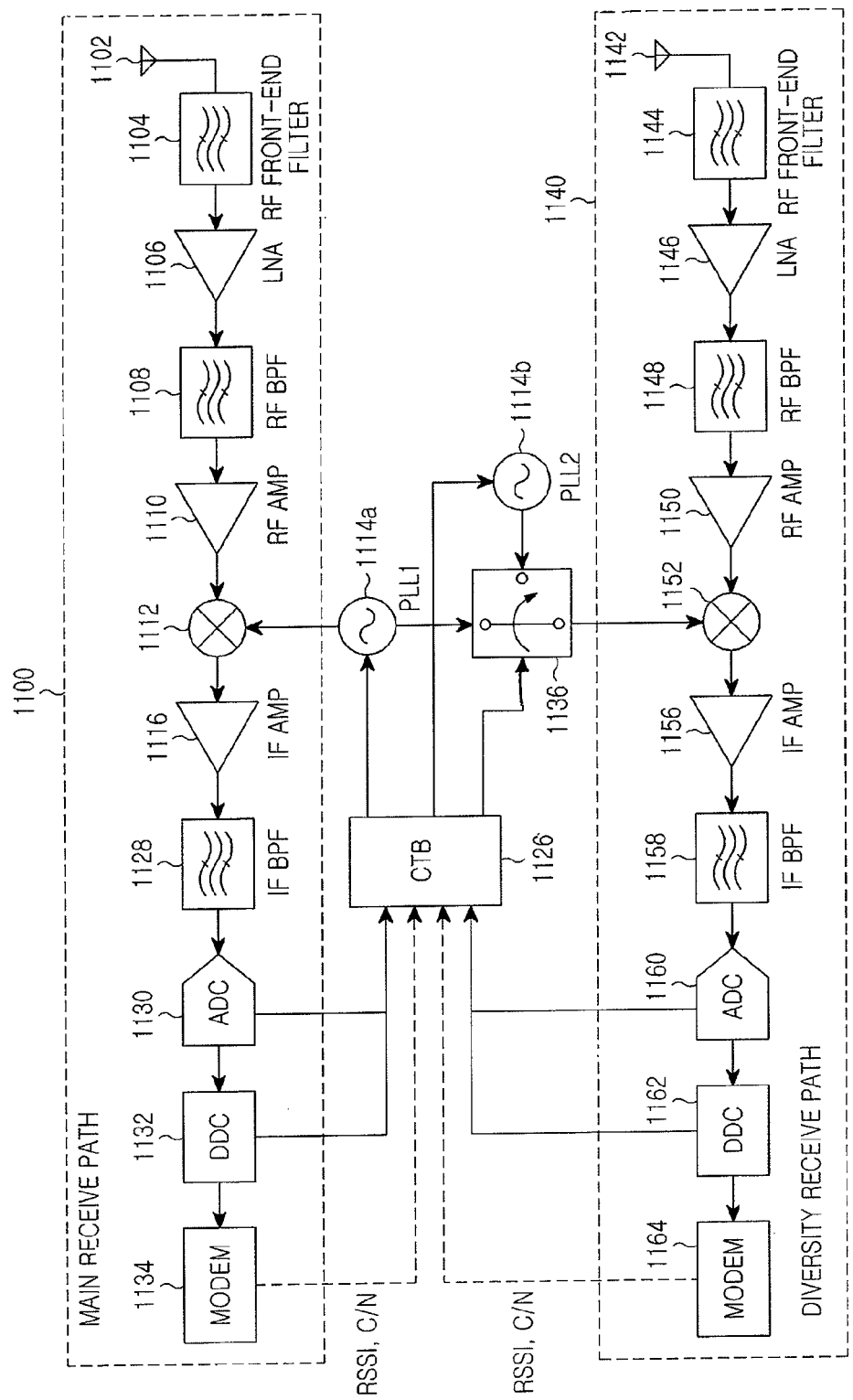
FIG. 11 is a block diagram showing a structure of a wideband receiver according to an exemplary embodiment of the present invention.

FIG. 11 is a structure of a wideband receiver according to an exemplary embodiment of the present invention. While a plurality of components constituting a wideband receiver are shown herein, it should be understood that these components are not provided to limit the scope of the present invention and various modifications can be made without departing from the scope of the present invention.

Referring to FIG. 11, the wideband receiver includes a main receive path 1100 and a diversity receive path 1140, and each receive path 1100 (1140) includes an antenna 1102 (1142), an RF front-end filter 1104 (1144), an LNA 1106 (1146), an RF BPF 1108 (1148), an RF amplifier 1110 (1150), a mixer 1112 (1152), an IF amplifier 1116 (1156), an IF filter 1128 (1158), an ADC 1130 (1160), a DDC 1132 (1162), and a modem 1134 (1164). Operations of the receive paths are the same as described in FIGS. 3 and 8, so a description thereof will be omitted. The wideband receiver further includes two PLLs 1114a and 1114b capable of providing local oscillation signals of different frequencies, a switch 1136 for selecting one of the outputs from the two PLLs 1114a and 1114b, and providing the selected output to the diversity receive path 1140, and a control block (CTB) 1126 for controlling the switch 1136 according to the reception performance of the diversity receive path 1140.

The wideband receiver as illustrated in FIG. 11 receives a signal through the main receive path 1100 that receives a local oscillation signal of fLO1 from the first PLL 1114a. Upon sensing a reduction in reception performance of the main receive path 1100, the control block 1126 controls the switch 1136 to connect the second PLL 1114b to the diversity receive path 1140, and enables the diversity receive path 1140. Thereafter, the control block 1126 monitors reception performance obtained by the diversity receive path 1140. Various parameters may be used to monitor the reception performance. For example, the parameters may include a Receive Signal Strength Indicator (RSSI) and a Carrier to Noise Ratio (C/N), which are measured in the modem 1134 (1164).

If reception performance obtained with use of the local oscillation frequency generated by the second PLL 1114*b* is higher than the reception performance obtained with use of the local oscillation frequency generated by the first PLL 1114*a*, the control block 1126 changes the local oscillation frequency of the first PLL 1114*a* for the main receive path 1100, from $f_{LO1}$ to $f_{LO2}$, and enables the main receive path 1100 to generate a signal of the changed IF. In this manner, the main receive path 1100 uses a local oscillation frequency and its associated IF. The reception performance of the local oscillation frequency is determined via the diversity receive path 1140.

Figure 12:
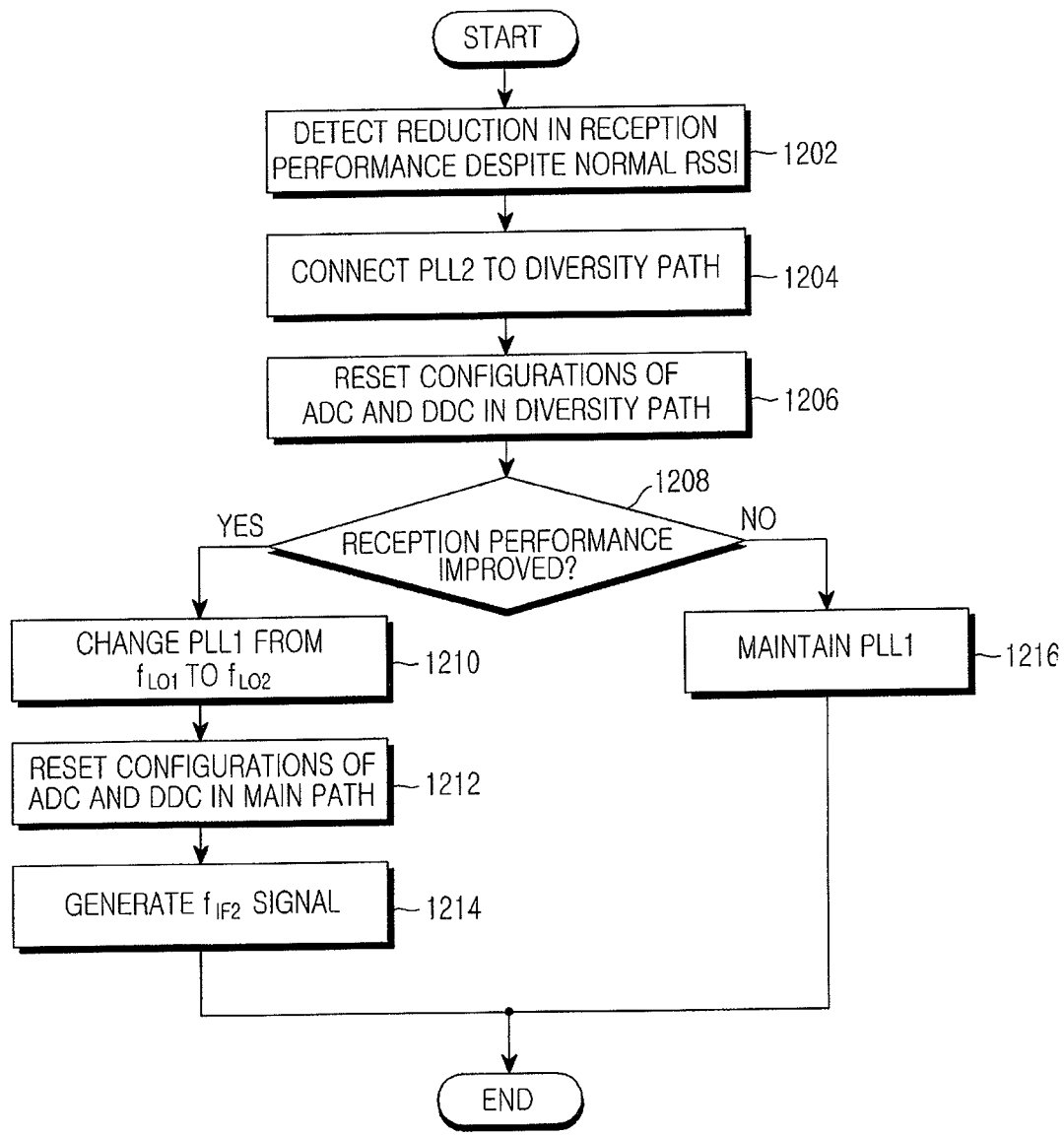
FIG. 12 is a flowchart showing a control operation of the wideband receiver shown in FIG. 11 according to an exemplary embodiment of the present invention.

FIG. 12 is a control operation of the wideband receiver shown in FIG. 11 according to an exemplary embodiment of the present invention. In the wideband receiver with the control block 1126, the main receive path 1100 receives a local oscillation frequency $f_{LO1}$ from the first PLL 1114*a* and generates an IF signal of $f_{IF1}$, and the diversity receive path 1140 may also receive the local oscillation frequency $f_{LO1}$ from the first PLL 1114*a* and generate an IF signal of $f_{IF1}$.

Referring to FIG. 12, the control block 1126 senses a reduction in reception performance in step 1202, and the reception performance may be measured based on various parameters. For example, the control block 1126 determines the reception performance depending on the difference between RSSI and C/N, which are provided from the modem 1134 in the main receive path 1100. The control block 1126 may alternatively determine the reception performance using RSSI and C/N provided from the modem 1164 in the diversity receive path 1140 that operates with the same local oscillation frequency of fLO1 as that of the main receive path 1100. If a difference between RSSI and C/N exceeds a threshold determined through experiments, the control block 1126 may determine a reduction in reception performance, even though the RSSI is high. Generally, if the RSSI is high, the C/N should also be high. However, if a half IF phenomenon occurs, the RSSI is high but the C/N decreases.

In step 1204, the control block 1126 controls the switch 1136 to connect the second PLL 1114*b* to the mixer 1152 in the diversity receive path 1140. In step 1206, the control block 1126 resets configurations of the ADC 1160 and the DDC 1162 so that they can process an IF signal converted by the local oscillation frequency $f_{LO2}$ from the second PLL 1114*b*, thereby enabling the diversity receive path 1140 to process a received signal according to $f_{LO2}$ from the second PLL 1114*b*.

In step 1208, the control block 1126 monitors reception performance obtained by the diversity receive path 1140 and determines whether the reception performance has been improved. The control block 1126 receives RSSI and C/N from the modem 1164 in the diversity receive path 1140, and determines that the reception performance has been improved when a difference between the RSSI and the C/N does not exceed a predetermined threshold. If the reception performance has not been improved, the control block 1126 maintains the local oscillation frequency of the main receive path 1100 at $f_{LO1}$ in step 1216, since the reduction in reception performance is for reasons other than the half IF problem.

If the reception performance in the diversity receive path 1140 has been improved, the control block 1126 controls the first PLL 1114*a* to change its output frequency from $f_{LO1}$ to $f_{LO2}$ in step 1210, and resets configurations of the ADC 1130 and the DDC 1132 in step 1212 so that they may process an IF signal converted by the changed local oscillation frequency $f_{LO2}$. In order to continuously sense the reception performance obtained by the diversity receive path 1140, the switch 1136 may be controlled to connect the first PLL 1114*a* to the mixer 1152 in the diversity receive path 1140. In step 1214, an IF signal of $f_{IF2}$ corresponding to the changed local oscillation frequency $f_{LO2}$ is generated in the mixer 1112.

For example, in steps 1204 to 1208, the control block 1126 may detect the local oscillation frequency optimized to improve reception performance, while adjusting an output frequency of the second PLL 1114*b* step by step. If the optimal local oscillation frequency $f_{LO}'$ is determined, the output frequency of the first PLL 1114*a* is changed from $f_{LO1}$ to $f_{LO}'$. By doing so, the wideband receiver of FIG. 12 can operate the main receive path 1100 using the optimal local oscillation frequency that does not cause the half IF problem, and its associated IF, while minimizing the change in the main receive path 1100.

As is apparent from the foregoing description, the half IF problem by the nonlinearity characteristic of the mixer is resolved, facilitating the wideband communication system. In addition, the wideband receiver can be realized in the structure of the existing communication system without influence on the received signal or significant structural modification.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A wideband receiver for a wireless communication system, the wideband receiver comprising:
    a receive path having a mixer for receiving a Radio Frequency (RF) signal having a frequency $f_{SG}$ and for converting the RF signal into an Intermediate Frequency (IF) signal having a frequency $f_{IF}$ by mixing the RF signal with a first local oscillation signal having a first local oscillation frequency $f_{LO1}$, and at least one Phase Locked Loop (PLL) for providing the first local oscillation signal to the mixer; and
    a control block for determining whether a half-IF signal having a center frequency of $f_{SG}-f_{IF}/2$ exists in the IF signal, and when the half-IF signal exists, for controlling the at least one PLL to generate a second local oscillation signal having a second local oscillation frequency $f_{LO2}$ greater than the first local oscillation frequency $f_{LO1}$.

2. The wideband receiver of claim 1, wherein the control block is configured to reset configurations of an Analog-to-Digital Converter (ADC) and a Digital Down-Converter (DDC) in the receive path so that the ADC and the DDC process an IF signal changed by the second local oscillation frequency $f_{LO2}$.

3. The wideband receiver of claim 2, wherein the second local oscillation frequency is determined based on a sampling rate of the ADC.

4. The wideband receiver of claim 1, wherein the second local oscillation frequency is determined by adding the frequency $f_{SG}$ of the RF signal to the frequency $f_{IF}$ of the IF signal.

5. The wideband receiver of claim 1, wherein:
    the control block is connected to a switch for selecting one of a first PLL generating a local oscillation signal having the first local oscillation frequency $f_{LO1}$ and a second PLL generating a local oscillation signal having a second local oscillation frequency $f_{LO2}$, and for connecting the selected PLL to the mixer, and
    wherein the control block controls the switch to select the second PLL when a half-IF signal having a center frequency of $f_{SG}-f_{IF}/2$ exists in the IF signal.

6. The wideband receiver of claim 1, wherein the control block comprises:
- a coupling block for detecting the IF signal, which is output from the mixer and is subject to IF filtering;
- a Band Pass Filter (BPF) for filtering the IF signal using a pass band having a center frequency of $f_{SG}-f_{IF}/2$;
- a detector for converting an output signal of the BPF into a voltage signal; and
- a frequency decision block for determining that the half-IF signal exists when a level of the voltage signal exceeds a predetermined threshold.

7. A method for controlling a wideband receiver for a wireless communication system, the method comprising:
- detecting an Intermediate Frequency (IF) signal from a receive path having a mixer for receiving a Radio Frequency (RF) signal having a frequency $f_{SG}$ and converting the RF signal into the IF signal having a frequency $f_{IF}$ by mixing the RF signal with a first local oscillation signal having a first local oscillation frequency $f_{LO1}$;
- determining whether a half-IF signal having a center frequency of $f_{SG}-f_{IF}/2$ exists in the IF signal; and
- when the half-IF signal exists, providing a second local oscillation signal to the receive path, the second local oscillation signal having a second local oscillation frequency $f_{LO2}$ greater than the first local oscillation frequency.

8. The method of claim 7, further comprising:
- resetting configurations of an Analog-to-Digital Converter (ADC) and a Digital Down-Converter (DDC) in the receive path so that the ADC and the DDC process an IF signal changed by the second local oscillation frequency $f_{LO2}$.

9. The method of claim 8, wherein the second local oscillation frequency is determined based on a sampling rate of the ADC.

10. The method of claim 7, wherein the second local oscillation frequency is determined by adding the frequency $f_{SG}$ of the RF signal to the frequency $f_{IF}$ of the IF signal.

11. The method of claim 7, wherein the providing of the second local oscillation signal comprises:
- selecting one of a first Phase Locked Loop (PLL) generating a local oscillation signal having the first local oscillation frequency $f_{LO1}$ and a second PLL generating a local oscillation signal having a second local oscillation frequency $f_{LO2}$; and
- connecting the selected PLL to the mixer.

12. The method of claim 7, wherein the determining of whether the half-IF signal exists comprises:
- filtering the IF signal via a pass band having a center frequency of $f_{SG}-f_{IF}/2$;
- converting the filtered signal into a voltage signal; and
- determining that the half-IF signal exists when a level of the voltage signal exceeds a predetermined threshold.

13. A wideband receiver for a wireless communication system, the wideband receiver comprising:
- a receive path for receiving a Radio Frequency (RF) signal and for generating a first local oscillation frequency based on the RF signal and an Intermediate Frequency (IF) signal; and
- a control block for determining whether a half-IF signal is present in the IF signal, and for controlling the receive path to generate a second local oscillation frequency greater than the first local oscillation frequency when it is determined that the half-IF signal is present in the IF signal.

* * * * *